United States Patent Office 3,296,580
Patented Jan. 3, 1967

3,296,580
ECHO SOUNDING APPARATUS
Peter Roy Hopkin, Hadleigh, Essex, England, assignor to S. Smith & Sons (England) Limited, London, England, a British company
Filed Nov. 17, 1964, Ser. No. 411,804
Claims priority, application Great Britain, Nov. 19, 1963, 45,590/63
8 Claims. (Cl. 340—3)

This invention relates to echo sounding apparatus for marine use in which pulses of acoustic energy are transmitted into the sea which contains objects to be detected and echo signals received from such objects are displayed on a display apparatus against a time scale. For example the display apparatus may be a recorder having a stylus to which the echo signals are fed and which is caused to traverse a chart of paper during the time that echo signals are received. The stylus marks the paper on receipt of the echo signal and the position of the mark on the paper indicates the range of the object giving rise to that echo signal.

The chart of paper is moved by a motor slowly or in steps so that the echo signals are always recorded on a clean part of the paper. The stylus may for example be carried on a rotating arm and arranged to engage the paper during an arc of its circular path or may be carried on an endless belt which is continuously traversed and arranged to engage the paper during part of its cycle. The transmission of a pulse of energy may be arranged to occur before the stylus engages the paper and in this case echo signals from objects near the echo sounding apparatus are not recorded. This feature is utilized in marine echo sounding apparatus for the detection of fish in which it is often useful to record only the echo signals from the sea bed and the adjacent few fathoms. A difficulty which arises when echo sounding apparatus is used in this way is that the ship carrying the echo sounding apparatus moves up and down continuously in the sea with the result that the sea bed contour appears as a jagged line even if the sea bed is quite flat. This tends to make the interpretation of the chart markings more difficult.

An object of this invention is to provide echo sounding apparatus for marine use including means to reduce or eliminate the difficulty mentioned above.

According to this invention there is provided echo sounding apparatus for marine use comprising transmitting and receiving means for transmitting and receiving pulses of acoustic energy and for generating electrical signals in response to received acoustic energy, a charge storage tube for storing and reproducing electrical signals connected to the transmitting and receiving means so that it receives the said generated electrical signals, a recorder connected to the charge storage tube so that it records reproduced signals and control means connected to the charge storage tube and comprising a first control circuit for producing signals which initiate the storage and reproduction modes of operation of the charge storage tube and for deflecting the electron beam during storage and reproduction of the electric signals, and a second control circuit connected to the transmitting and receiving means for receiving the said generated electrical signals and for terminating the storage of electrical signals by the charge storage tube on receipt of the signal corresponding to the sea bed echo, the said signal having an amplitude greater than a predetermined value.

A charge storage tube is to be understood to be a device for the storage of electrical signals in which the signals are stored in the form of electric charge on a target. The signals are stored on ("written" onto) the target when an electron beam is deflected across the target. Similarly the signals are reproduced ("read") from the target when an electron beam is deflected across the target. A single electron beam may be used for storage and reproduction of signals or one electron beam is used for storage of signals and another for reproduction of signals.

In use, the recorder produces a mark corresponding to the sea bed echo which appears in substantially the same position whatever the time of receipt of the sea bed echo by the transmitting and receiving means. A record of the echoes from the region adjacent to the sea bed is obtained, with the sea bed represented by a straight line.

Preferably the first control circuit deflects the electron beam of the charge storage tube more rapidly during storage of the electrical signals than during reproduction of electrical signals, whereby the recorder produces an expanded record of the echo signals from the region adjacent to the sea bed.

In use the slower the electron beam is deflected when the signals are reproduced, the greater is the area of the paper marked by the echo signals stored in the charge storage tube.

Preferably the recorder comprises a stylus arranged to traverse a closed path and to engage a chart during part of its path and the first control circuit comprises a switch arranged to be operated whenever the stylus is in the part of its path in which it can engage the chart, the signals applied to the charge storage tube when the switch is operated being such that the charge storage tube can then only reproduce electrical signals.

Preferably the first control circuit comprises a circuit connected to the transmitting and receiving means and arranged to produce a signal on receipt of the signal corresponding to the sea bed echo, the storage of electrical signals by the charge storage tube being initiated after a time interval has elapsed from the production of the signal.

Preferably the first control circuit comprises a switch arranged to be operated just after the stylus has moved into the part of its path in which it can engage the chart, the operation of the switch serving to initiate the reproduction of the signals stored in the charge storage tube.

In one preferred arrangement the charge storage tube has only one electron beam which is deflected in opposite directions during storage and reproduction of electrical signals by the charge storage tube.

In another preferred arrangement the charge storage tube has only one electron beam which is deflected in the same direction during storage and reproduction of electrical signals but when the second control circuit receives the electrical signal corresponding to the sea bed echo the electron beam is deflected through a fixed distance in the opposite direction.

Preferably the electrical signals received by the charge storage tube from the transmitting and receiving means serve to modulate the intensity of the electron beam.

Echo sounding apparatus for use in the detection of fish and in accordance with this invention will now be described with reference to the accompanying drawings of which:

Figure 1:
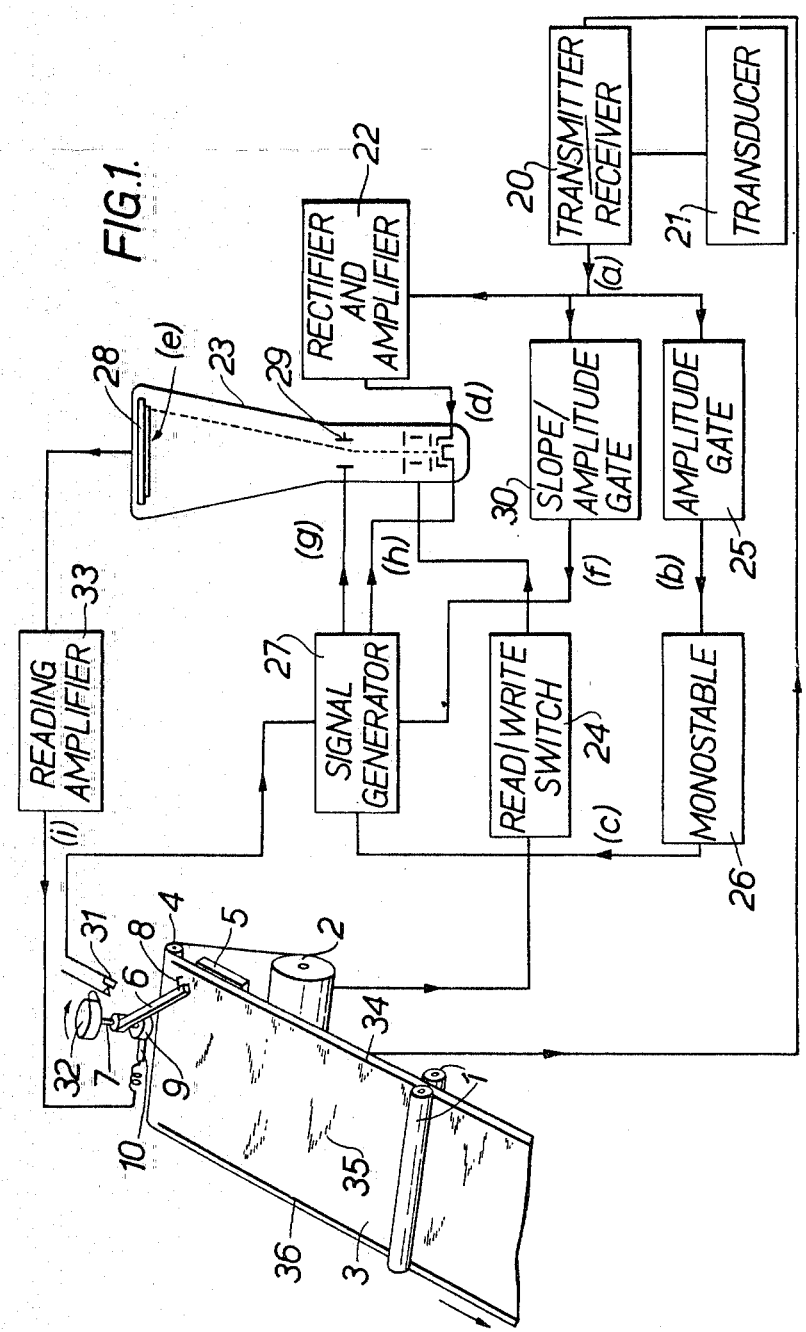
FIGURE 1 is a block diagram of the apparatus.

The apparatus has a rotating arm recorder in which a pair of paper feed rollers 1 draw a chart of electrolytic recording paper 3 from a roll 2 over a roller 4 and a grounded platen 5. An arm 6 carried on a shaft 7, which is driven at a constant speed by a motor (not shown), carries a stylus 8 which engages the paper 3 resting on the platen 5 during part of its circular path. Signals may be fed to the stylus 8 through a slip ring 9 carried on the shaft 7, and a co-operating brush 10. A signal fed to the stylus 8 results in a current passing through the paper 3 to the platen 5 marking the paper 3. The shaft 7 carries a cam (not shown) which operates a pair of contacts (not shown) which in turn control a transmitter/receiver 20. When the contacts are operated the transmitter/receiver 20 generates a pulse of sonic or ultrasonic energy which is emitted by a transmitting/receiving transducer 21. Echo signals received by the transducer 21 are amplified by the transmitter/receiver 20 to give a waveform *a* (FIGURE 2) in which A corresponds to the transmitted pulse, B to a fish echo signal and C to the sea bed echo signal.

The received signals are fed to a rectifier and amplifier 22 which produces a voltage signal (waveform *d*) fed to a charge storage tube 23 where they are written onto a target 28. A read/write switch 24 is controlled by a pair of contacts (not shown) operated by a cam (not shown) carried on the shaft 7, and applies signals to electrodes of the tube 23 to render it capable of storing or reproducing electrical signals, the storage of signals being known as "writing" and the reproduction of signals being known as "reading." It is arranged that read/write switch 24 is operated to change the tube 23 to the reading mode just before the stylus 8 engages the paper 3 and to change the tube 23 to the writing mode just after the stylus 8 leaves the paper 3. The received signals are also fed to an amplitude gate 25 which is only sensitive to echo signals above a predetermined level and is only operated by the sea bed echo signal C to produce a voltage signal (waveform *b*) that is a negative going pulse. The amplitude gate 25 incorporates means to prevent the transmission signal A or a secondary sea bed echo (i.e. an echo which is reflected from the surface of the sea back to the sea bed and is reflected by the sea bed to the transducer 21) operating it. Such means are described in U.S. Patent 3,119,091 to Halliday et al., issued January 21, 1964, and in the J. Brit. I.R.E., volume 25, No. 1, page 78. The waveform *b* is fed to a monostable circuit 26 which produces a voltage signal (waveform *c*) that is a negative going pulse having a length about 25 ms. shorter than the time between successive transmissions of pulses. The waveform *c* also is fed to a signal generator 27 which is triggered by the rising edge of the waveform *c*. The signal generator 27 produces a negative potential (waveform *h*) which is fed to the cathode of the tube 23 and enables signals to be written onto and read from the target 28.

The signal generator 27 when triggered by the waveform *c* produces a voltage signal (waveform *g*) which is a linearly falling potential and is fed to the deflection plates 29 of the tube 23. The electron beam of the tube 23 is deflected by the waveform *g* so that the received echo signals *a* can be written onto the target 28 in the form of a charge storage pattern.

The received echo signals *a* are also fed to slope/amplitude gate 30 constructed as described by our British Patent No. 878,111 which produces a narrow pulse in response to each sea bed echo signal (waveform *f*). The waveform *f* is fed to the signal generator 27 ending the negative potential of waveform *h* and preventing the potential of waveform *g* from falling any further. The signal generator 27 is also triggered when a pair of contacts 31 which co-operate with a cam 32 on the shaft 7 are closed; the contacts 31 are closed by the cam 32 each time the stylus 8 is brought into engagement with the paper 3. When the signal generator 27 is triggered in this manner, there is a resultant rise in the waveform *g* and a fall to a negative value in the waveform *h*. The negative potential of the waveform *h* applied to the cathode of the tube 23 renders it operative while the stylus 8 engages the paper 3, and the waveform *g* now has a linearly rising potential applied to the deflection plates 29 of the cathode ray tube 23. This rising potential deflects the beam in the opposite direction to that when the waveform *g* has a linearly falling potential. The signals on the target 28 are read out through a reading amplifier 33 and fed to the brush 10 (waveform *i*). The potential of waveform *g* rises until it reaches its datum level when the potential of waveform *h* is immediately brought to its datum level.

The operation of the apparatus will now be described. Every sea bed echo signal is selected by the amplitude gate 25 and used to trigger the monostable 26. The output waveform of the monostable circuit 26 triggers the signal generator 27 which produces the voltage signals of waveforms *g* and *h* which deflect the electron beam of the tube 23 and render the tube 23 operative respectively. The echo signals (from the transmission of energy following that which gave rise to the sea bed echo signal which is selected by the amplitude gate 25) are written onto the target 28 during the period that the beam is deflected until the sea bed echo signal is received. Reception of the sea bed echo signal triggers the slope/amplitude gate 30 which in turn triggers the signal generator 27. The electron beam remains steady with a narrow signal on the target 28 representing the sea bed echo signal (waveform *e*). When the cam 32 closes the contacts 31 the signal generator 27 is again triggered with the result that the electron beam is deflected in the opposite direction and signals stored in the target 28 are read out and fed to the stylus 8 through the amplifier 33 and the brush 10. The first signal fed to the paper 3 is the sea bed echo signal followed by a signal B (waveform *i*) which is the fish echo signal B shown in waveform *a*.

The paper 3 is marked with a narrow black line 34 representing the sea bed (in accordance with the Sparling et al. U.S. Patent No. 3,098,210) and various markings 35 representing fish. The echo signals from the region near the sea bed are recorded and the signals may be read out from the tube 23 at, for example, a speed fifteen times slower than that at which they were written onto the target 28 giving an expanded record. A line 36 indicates the upper limit of the region. The position of the contacts which operate the transmitter/receiver 20 is adjustable so that the charge storage tube can be in the writing mode when the sea bed echo signal arrives whatever the depth of water. The range from which echo signals are written onto the target 28 may thus be altered.

In the apparatus described the signals are recorded on the chart of paper 3 in the reverse direction to that in which they were received. In a modification when the slope/amplitude gate 30 produces a signal the potential of the waveform *g* not only ceases to fall but is rapidly increased through a fixed potential, thereby deflecting the beam backwards through a fixed distance.

When the contacts 31 are operated the waveform *g* has a falling potential and the signals are read out from the tube 23 in the same order that they were written into it. The fish markings 35 will therefore be recorded before the line 34. After the signals have been recorded on the paper 3 the potential of the waveform *g* is returned to its datum level for the next set of echo signals.

Figure 2:
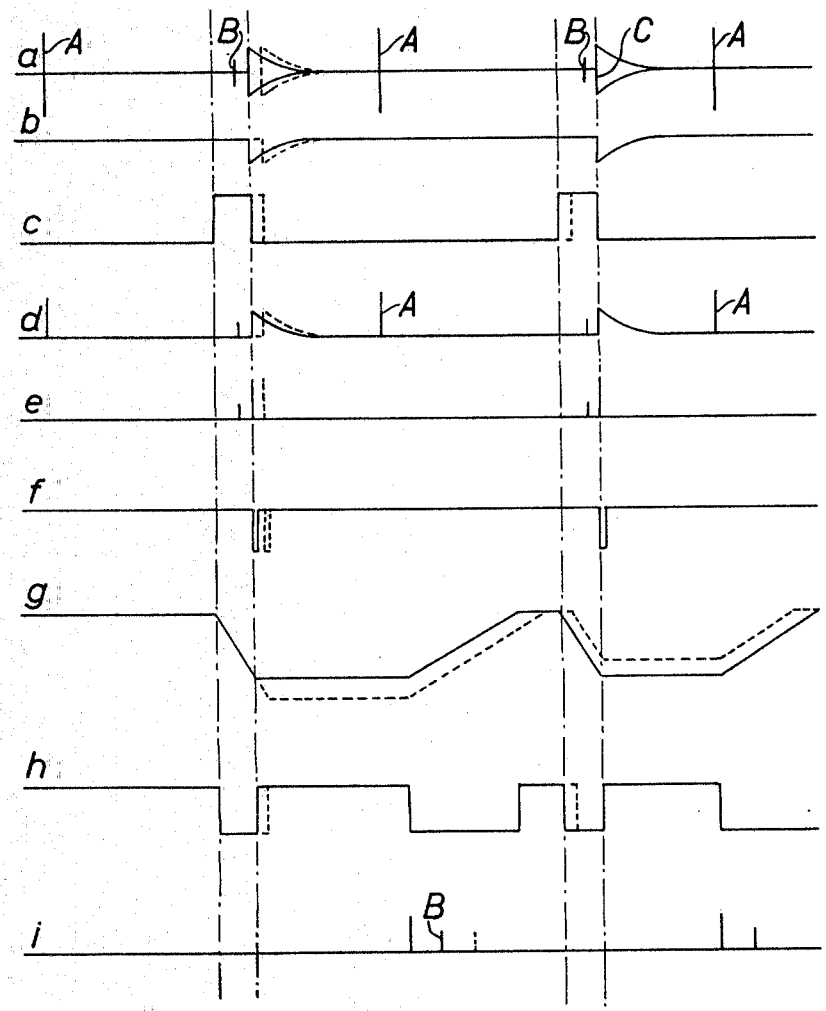
FIGURE 2 shows the waveforms occurring at various points in the circuit.

FIGURE 2 shows in dotted outline how the waveforms differ if the depth of the sea water changes.

The apparatus described employs a charge storage tube which uses electrostatic deflection. However a charge storage tube which employs electromagnetic deflection may also be used conveniently. Furthermore, an ordinary cathode ray tube may be used as a charge storage tube as is described in chapter 21 of the textbook "Waveforms" volume 19 of the MIT Radiation Laboratory series published by McGraw-Hill Book Co., Inc. It is also possible to use a charge storage tube in which the beam is deflection-modulated instead of one in which the beam is intensity modulated.

I claim:

1. Echo sounding apparatus for marine use comprising transmitting and receiving means for transmitting and receiving pulses of acoustic energy and for generating electrical signals in response to received acoustic energy, a charge storage tube for storing and reproducing electrical signals connected to the transmitting and receiving means so that it receives the said generated electrical signals, a recorder connected to the charge storage tube so that it records reproduced signals, control means connected to the charge storage tube and comprising a first control circuit for producing signals which initiate the storage and reproduction modes of operation of the charge storage tube and for deflecting the electron beam during storage and reproduction of the electric signals, and a second control circuit connected to the transmitting and receiving means for receiving the said generated electrical signals, and for terminating the storage of electrical signals by the charge storage tube on receipt of the signal corresponding to the sea bed echo which has an amplitude greater than a predetermined value.

2. Echo sounding apparatus as claimed in claim 1 wherein the first control circuit deflects the electron beam of the charge storage tube more rapidly during storage of electrical signals than during reproduction of electric signals, whereby the recorder produces an expanded record of the echo signals from the region adjacent to the sea bed.

3. Echo sounding apparatus as claimed in claim 1 wherein the recorder comprises a stylus arranged to traverse a closed path and to engage a chart during part of its path and the first control circuit comprises a switch arranged to be operated whenever the stylus is in the part of its path in which it can engage the chart, the signals applied to the charge storage tube when the switch is operated being such that the charge storage tube can then only reproduce electrical signals.

4. Echo sounding apparatus as claimed in claim 3 wherein the first control circuit comprises a switch arranged to be operated just after the stylus has moved into the part of its path in which it can engage the chart, the operation of the switch serving to initiate the reproduction of the signals stored in the charge storage tube.

5. Echo sounding apparatus as claimed in claim 1 wherein the first control circuit comprises a circuit connected to the transmitting and receiving means and arranged to produce a signal on receipt of the signal corresponding to the sea bed echo, the storage of electrical signals by the charge storage tube being initiated after a time interval has elapsed from the production of the signal.

6. Echo sounding apparatus as claimed in claim 1 wherein the charge storage tube has only one electron beam which is deflected in opposite directions during storage and reproduction respectively of electrical signals by the charge storage tube.

7. Echo sounding apparatus as claimed in claim 1 wherein the charge storage tube has only one electron beam which is deflected in the same direction during storage and reproduction of electrical signals but when the second control circuit receives the electrical signal corresponding to the sea bed echo the electron beam is deflected through a fixed distance in the opposite direction.

8. Echo sounding apparatus as claimed in claim 1 wherein the electrical signals received by the charge storage tube from the transmitting and receiving means serve to modulate the intensity of the electron beam.

References Cited by the Examiner
UNITED STATES PATENTS

| 2,979,714 | 4/1961 | Wallace | 343—11 |
| 3,019,411 | 1/1962 | Haslett et al. | 340—1 |

FOREIGN PATENTS 944,816 12/1963 Great Britain.

CHESTER L. JUSTUS, *Primary Examiner.*

R. A. FARLEY, *Assistant Examiner.*